US012697950B2

(12) United States Patent
Mounzer et al.

(10) Patent No.: US 12,697,950 B2
(45) Date of Patent: Aug. 4, 2026

(54) METHOD FOR CONTROLLING A DECELERATION REQUEST IN A ONE-PEDAL-DRIVING MODE OF A VEHICLE

(71) Applicant: Volvo Car Corporation, Gothenburg (SE)

(72) Inventors: Raid Mounzer, Gothenburg (SE); Mikael Riikonen, Gothenburg (SE); Mattias Kroon, Gothenburg (SE); Hans Englander, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 22 days.

(21) Appl. No.: 18/416,037

(22) Filed: Jan. 18, 2024

(65) Prior Publication Data

US 2024/0246517 A1    Jul. 25, 2024

(30) Foreign Application Priority Data

Jan. 19, 2023    (EP) .................................... 23152533

(51) Int. Cl.
B60T 8/175        (2006.01)
B60W 30/02        (2012.01)
B60W 30/18        (2012.01)

(52) U.S. Cl.
CPC ............. B60T 8/175 (2013.01); B60W 30/02 (2013.01); B60W 30/18172 (2013.01); B60W 2520/26 (2013.01)

(58) Field of Classification Search
CPC . B60T 8/175; B60W 30/02; B60W 30/18172; B60W 2520/26

(Continued)

(56) References Cited

U.S. PATENT DOCUMENTS 5,439,425 A * 8/1995 Ramm ................... F16H 61/20
                                                        180/293
6,488,344 B2    12/2002 Huls et al.

(Continued)

FOREIGN PATENT DOCUMENTS

CN      102381178 B    7/2014
CN      110194168 B    4/2021
CN      110696794 B    7/2022

OTHER PUBLICATIONS

Search Report issued for EP Application No. 23152533.8, mailed on Jul. 14, 2023, 7 pages.

(Continued)

*Primary Examiner* — Lindsay M Low
*Assistant Examiner* — John D Bailey
(74) *Attorney, Agent, or Firm* — Davé Law Group LLC; Raj S. Davé

(57) ABSTRACT

According to an embodiment, it is a method comprising receiving a slip information, wherein the slip information describes a longitudinal slip of the respective wheel of a vehicle, comparing the slip information of each wheel to a predefined wheel slip threshold; and triggering a reduction of a deceleration level of a deceleration request when the slip information of at least one wheel exceeds the predefined wheel slip threshold; and wherein the method is operable for controlling the deceleration request in a one-pedal-driving mode of the vehicle, and wherein the deceleration request relates to the deceleration level being a function of a position of a drive pedal.

20 Claims, 1 Drawing Sheet

(58) Field of Classification Search
USPC ........................................................ 701/82
See application file for complete search history.

(56) References Cited

U.S. PATENT DOCUMENTS

| | | | |
|---|---|---|---|
| 6,691,013 | B1 | 2/2004 | Brown |
| 8,500,220 | B2 * | 8/2013 | Einig ................. B60T 8/17554 |
| | | | 303/148 |
| 11,584,225 | B2 * | 2/2023 | Velazquez Alcantar ..................... |
| | | | B60K 26/02 |
| 2012/0133202 | A1 * | 5/2012 | Mui ......................... B60L 3/10 |
| | | | 303/152 |
| 2019/0135244 | A1 * | 5/2019 | Shiozawa ................. B60T 1/10 |
| 2020/0114889 | A1 * | 4/2020 | Egnor ..................... B60T 11/20 |
| 2021/0122341 | A1 * | 4/2021 | Okumura ................. B60T 8/72 |
| 2021/0155240 | A1 * | 5/2021 | Hashimoto ............. B60L 3/108 |
| 2021/0402877 | A1 * | 12/2021 | Velazquez Alcantar ..................... |
| | | | B60W 30/18181 |
| 2022/0250634 | A1 * | 8/2022 | Weston ............... B60W 50/038 |
| 2023/0027431 | A1 * | 1/2023 | Kaneko .............. B60L 15/2009 |

OTHER PUBLICATIONS

Jalali, K., Uchida, T., McPhee, J., & Lambert, S. (2012). Development of a Fuzzy Slip Control System for Electric Vehicles with In-wheel Motors. SAE International Journal of Alternative Powertrains, 1(1), 46-64. http://www.jstor.org/stable/26168964.

* cited by examiner

METHOD FOR CONTROLLING A DECELERATION REQUEST IN A ONE-PEDAL-DRIVING MODE OF A VEHICLE

CROSS-REFERENCE TO RELATED APPLICATIONS

This application claims the benefit of European Patent Application Number 23152533.8, filed on Jan. 19, 2023, which is hereby incorporated by reference in its entirety.

FIELD OF INVENTION

The present disclosure relates to a method for controlling a deceleration request in a one-pedal-driving mode of a vehicle.

BACKGROUND

In a situation in which the vehicle decelerates while a one-pedal-driving mode is used, stable and predictable driving behavior needs to be ensured.

Therefore, there is a need to further improve driving stability and predictability of a driving behavior of a vehicle in the context of a one-pedal-driving mode.

SUMMARY

The present disclosure relates to a method for controlling a deceleration request in a one-pedal-driving mode of a vehicle.

The present disclosure additionally is directed to a data processing apparatus comprising means for carrying out such a method.

The present disclosure further relates to a computer program and a computer readable storage medium.

Furthermore, the present disclosure is directed to a drivetrain for a vehicle and a vehicle.

One-pedal-driving is a concept of speed control for a vehicle, wherein the vehicle can be actively accelerated and actively decelerated using one pedal only. A corresponding drive mode is called a one-pedal driving mode. Such a drive mode is especially used in electric vehicles such as battery electric vehicles. In more detail, if the drive pedal or accelerator pedal is depressed, an acceleration request is generated for the associated vehicle, i.e. the vehicle is requested to accelerate. If the drive pedal or accelerator pedal is fully or partially released from a fully or partially depressed position, a deceleration request is generated for the associated vehicle, i.e. the vehicle is requested to decelerate. The same may happen if the use of a driver assistance system, e.g. an automatic cruise control, is cancelled. In this context, both an acceleration level of the acceleration request and a deceleration level of the deceleration request usually are a function of a position of the drive pedal. This means that the vehicle is requested to strongly accelerate if the drive pedal is deeply depressed, wherein the vehicle is requested to just slightly accelerate if the drive pedal is just depressed a little. Correspondingly, the vehicle is requested to strongly decelerate if the drive pedal is released fully or to a high extent, wherein the vehicle only is requested to decelerate a little, if the drive pedal is only released by a small amount.

Additionally, as a general rule, vehicles shall drive in a stable and predictable manner. This, of course, also applies in connection with a one-pedal-driving mode. Thus, in a situation in which the vehicle decelerates while a one-pedal-driving mode is used, stable and predictable driving behavior needs to be ensured. To this end, for example, antilock braking systems or stability control systems may be used in connection with a one-pedal-driving mode.

It is an objective of the present disclosure to further improve driving stability and predictability of a driving behavior of a vehicle in the context of a one-pedal-driving mode.

The problem is at least partially solved or alleviated by the subject matter of the independent claims of the present disclosure, wherein further examples are incorporated in the dependent claims.

According to a first aspect, there is provided a method for controlling a deceleration request in a one-pedal-driving mode of a vehicle. The deceleration request relates to a deceleration level being a function of a position of a drive pedal. The method comprises:

receiving a slip information for each of the vehicle's wheels or for each of the vehicle's axles, wherein the slip information describes a longitudinal slip of the respective wheel, comparing the slip information of each wheel to a predefined wheel slip threshold, and triggering a reduction of the deceleration level of the deceleration request if the slip information of at least one wheel exceeds the predefined wheel slip threshold.

In this context, a slip information may be determined by comparing a speed or an acceleration or a combination of speed and acceleration of a first component of the vehicle to a speed, an acceleration or a combination of speed and acceleration of a second component of the vehicle. The first component may be a wheel of the vehicle, an axle of the vehicle, a motor of the vehicle or any part of the vehicle that can give an indication of the rotational speed of one of these components. The second component may be a different wheel of the vehicle, a different axle of the vehicle or a different motor of the vehicle. Moreover, the vehicle can be considered to be a second component. As an alternative to the second component, a physical limit speed or a physical limit acceleration or a combination of the physical limit speed and the physical limit acceleration may be used.

In an example, a slip information may be determined by comparing an acceleration information of one or more wheels, describing an acceleration of the respective wheel, to a vehicle acceleration information describing an acceleration of the vehicle. Alternatively, an acceleration information of one wheel may be compared to an acceleration information of another wheel in order to determine a slip information. This may be done for all wheels of the vehicle. In another example, a motor acceleration information, i.e. an information describing an acceleration of a motor output shaft, or an axle acceleration information, i.e. an information describing an acceleration of an axle, may be used instead of the wheel acceleration information. Alternatively or additionally, a slip information may be determined by comparing a speed information of one or more wheels, describing a speed of the respective wheel, to a vehicle speed information describing a speed of the vehicle. Alternatively, a speed information of one wheel may be compared to a speed information of another wheel in order to determine a slip information. This may be done for all wheels of the vehicle. In another example, a motor speed information, i.e. an information describing a speed of a motor output shaft, or an axle speed information, i.e. an information describing a speed of an axle, may be used instead of the wheel speed information.

In a further example, the slip information may be determined by comparing an acceleration information of one or more wheels, describing an acceleration of the respective wheel, to a physical limit acceleration describing a maximal theoretically possible acceleration. In another alternative, the slip information may be determined by comparing a speed information of one or more wheels, describing a speed of the respective wheel, to a physical limit speed describing a maximal theoretically possible speed. In a further example, the acceleration information of one or more wheels may be replaced by a motor acceleration information or an axle acceleration information. Similarly, the speed information of one or more wheels may be replaced by a motor speed information or an axle speed information.

It is noted in all of the above examples, in case the motor is coupled to a gear box, the motor speed or the motor acceleration may be measured at a gearbox input shaft, at a gearbox output shaft or at a gearbox intermediate shaft.

Thus, in simplified words, the method consists in determining whether excessive longitudinal slip, i.e. slip exceeding the predefined wheel slip threshold, occurs for at least one wheel. If so, the deceleration level of the deceleration request is reduced. This has the effect that longitudinal wheel slip is reduced or at least not increased. Consequently, driving stability is enhanced. Furthermore, due to the fact that a driver of a vehicle usually does not expect the vehicle to slip, reducing the longitudinal wheel slip by reducing the deceleration level of the deceleration request increases the predictability of driving behavior. For example, the deceleration level may be reduced until the longitudinal wheel slip has been reduced to a level that is not noticeable by the driver. Predictability of driving behavior enhances road safety since only then, a driver can react appropriately to a current or upcoming traffic situation.

It is noted that the method according to the present disclosure is executed on vehicle level. This means that the controlled deceleration request relates to a deceleration of the vehicle in its entirety. Consequently, other systems may be used in order to split the deceleration request on vehicle level into wheel-specific deceleration requests. A wheel-specific deceleration request is to be understood as a deceleration request for a single wheel of the vehicle. The wheel specific deceleration request may relate to a reference deceleration torque. Moreover, the fact that the present method is executed on vehicle level does not exclude other vehicle dynamics systems from being used. Examples of vehicle dynamics systems include brake antilock systems, traction control systems and driving stability control systems.

It is further noted that the method of the present disclosure relates to controlling a deceleration request, i.e. a desired deceleration. Of course, an actual deceleration of a vehicle for which the method is performed, may differ from the request.

In an example, the deceleration level of the deceleration request relates to a deceleration level which has been most common for past driving cycles. This means that the standard deceleration level is determined based on a driving history. Setting the standard deceleration level to the most common deceleration level has the advantage that the necessity to use a brake pedal may be reduced. The standard deceleration level is, thus, high enough to cover most driving situations and low enough not to cause instability of the vehicle in usual driving situations. This deceleration level may be reduced when performing the method of the present disclosure. This may be necessary if road friction is unusually low for at least one wheel.

In an example, the method comprises triggering a reduction of the deceleration level of the deceleration request if the slip information of at least two wheels exceeds the predefined wheel slip threshold. This means that the condition for triggering a reduction of the deceleration level of the deceleration request is that at least two wheels experience a longitudinal wheel slip that exceeds the predefined wheel slip threshold. In simplified words, at least two wheels experience excessive longitudinal slip. Since at least two wheels experiencing excessive longitudinal slip has a negative influence on driving stability, applying the method of the present disclosure, i.e. reducing the deceleration level of the deceleration request, improves driving stability. Based thereon, also the predictability of driving behavior is enhanced.

In an example, the at least two wheels are wheels of the same axle. In a case in which two wheels of the same axle experience a longitudinal slip that exceeds the predefined longitudinal slip threshold, driving stability is affected in a negative sense. This also means that lateral forces which the wheels of this axle may transmit to the road are strongly reduced. By applying the method of the present disclosure, driving stability and predictability of driving behavior can, thus, be increased. The axle may be a front axle or a rear axle.

It is noted that in an example in which the method of the present disclosure is only performed if two wheels of the same axle experience longitudinal wheel slip exceeding the predefined longitudinal wheel slip threshold, the method is not performed in a is so-called split-μ situation. In such a situation, one wheel of the axle experiences a comparatively high longitudinal slip, wherein the other wheel of the axle does not experience excessive longitudinal slip.

In an example, the method comprises triggering a reduction of the deceleration level of the deceleration request if the slip information of all wheels exceeds the predefined wheel slip threshold. In other words, the method is performed if all wheels experience a longitudinal wheel slip exceeding the predefined longitudinal wheel slip threshold. This is efficient way to control vehicle stability.

In an example, the deceleration request relates to a regenerative deceleration and/or a deceleration through friction brakes. Thus, the deceleration request may request an electric machine to operate as a generator and thereby decelerate the vehicle. Alternatively or additionally, the deceleration request may request a friction brake to be activated in order to decelerate the vehicle.

In an example, the method further comprises:

receiving a brake pedal operation information, and eliminating the reduction of the deceleration level of the deceleration request.

In other words, the deceleration level of the deceleration request is put back to its unreduced state if the brake pedal is depressed by a driver. Thus, operating the brake pedal overrules the reduction of the deceleration level. In this context, the reduction of the deceleration level may be eliminated in one step or in several steps, i.e. gradually. Since in a situation in which a driver operates the brake pedal, the driver intends to request a deceleration of the vehicle being higher than the deceleration level, which is usually provided by releasing the drive pedal, eliminating the reduction of the deceleration level in such a case improves the predictability of the vehicle behavior.

In an example, eliminating the reduction of the deceleration level of the deceleration request comprises ramping out the reduction of the deceleration level. This means that the deceleration level is continually increased up to its original level over a predefined time span. The increase may also be performed in several steps. In other words, the method does not react abruptly. Thus, the driving behavior of the vehicle is predictable for a driver at all times.

In an example, triggering a reduction of the deceleration level of the deceleration request comprises triggering a reduction by a predefined reduction increment. This has the advantage that after the reduction by a predefined reduction increment, the driving situation can be re-evaluated. This means that updated slip information can be collected and assessed. In doing so, over-compensation of the longitudinal wheel slip exceeding the predefined longitudinal wheel slip threshold is avoided or at least reduced to a minimum.

In an example, the method is executed periodically or according to a predefined schedule. This has the effect that the performance of the method can be regularly adapted to a driving situation changing over time. In more detail, the magnitude of the reduction of the deceleration level may be adapted to a changing driving situation. This also includes that the execution of the method may be abandoned if it is not needed any more.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

According to a second aspect, there is provided a data processing apparatus comprising means for carrying out the method of the present disclosure. As has already been explained in connection with the method according to the present disclosure, using such a data processing apparatus increases the driving stability and the predictability of driving behavior of a vehicle.

According to a third aspect, there is provided a computer program comprising instructions which, when the computer program is executed by a computer, cause the computer to carry out the method of the present disclosure. Using such a computer program increases the driving stability and the predictability of driving behavior of a vehicle.

According to a fourth aspect, there is provided a computer readable storage medium comprising instructions which, when executed by a computer, cause the computer to carry out the method of the present disclosure. Using the computer readable storage medium increases the driving stability and the predictability of driving behavior of a vehicle.

According to a fifth aspect, there is provided a drivetrain for a vehicle. The drivetrain comprises at least one electric traction machine, at least one slip sensor, and a data processing apparatus according to the present disclosure. The data processing apparatus is communicatively connected to the at least one electric traction machine and the at least one slip sensor. In this context, the electric traction machine may be operated as an electric motor or as an electric generator depending on the driving situation. The at least one slip sensor may comprise one or more speed sensors and/or one or more acceleration sensors, such that a longitudinal slip may be determined as has already been explained above. Altogether, such a drivetrain may provide a stable and predictable driving behavior.

According to a sixth aspect, there is provided a vehicle comprising a drivetrain according to the present disclosure. Due to the fact that the drivetrain provides a stable and predictable driving behavior, also the vehicle may be operated in a stable and predictable manner.

It should be noted that the above examples may be combined with each other irrespective of the aspect involved.

These and other aspects of the present disclosure will become apparent from and elucidated with reference to the examples described hereinafter.

According to an embodiment, it is a method comprising receiving a slip information, wherein the slip information describes a longitudinal slip of the respective wheel of a vehicle, comparing the slip information of each wheel to a predefined wheel slip threshold; and triggering a reduction of a deceleration level of a deceleration request when the slip information of at least one wheel exceeds the predefined wheel slip threshold; and wherein the method is operable for controlling the deceleration request in a one-pedal-driving mode of the vehicle, and wherein the deceleration request relates to the deceleration level being a function of a position of a drive pedal.

According to an embodiment, it is a system comprising, an electric traction machine, a slip sensor, and a data processing apparatus, wherein the data processing apparatus is communicatively connected to the electric traction machine and the slip sensor; wherein the data processing apparatus is operable for, receiving a slip information, wherein the slip information describes a longitudinal slip of a wheel of a vehicle; comparing the slip information of each wheel to a predefined wheel slip threshold; and triggering a reduction of a deceleration level of a deceleration request when the slip information of at least one wheel exceeds the predefined wheel slip threshold; wherein the system is operable for controlling the deceleration request in a one-pedal-driving mode of the vehicle, and wherein the deceleration request relates to the deceleration level being a function of a position of a drive pedal.

According to an embodiment, it is a non-transitory computer readable medium having stored thereon instructions executable by a computer system to perform operations comprising, receiving a slip information, wherein the slip information describes a longitudinal slip of a wheel of a vehicle; comparing the slip information of each wheel to a predefined wheel slip threshold; and triggering a reduction of a deceleration level of a deceleration request when the slip information of at least one wheel exceeds the predefined wheel slip threshold; wherein the instructions are operable for controlling the deceleration request in a one-pedal-driving mode of the vehicle, and wherein the deceleration request relates to the deceleration level being a function of a position of a drive pedal.

BRIEF DESCRIPTION OF DRAWINGS

Examples of the disclosure will be described in the following with reference to the following drawings.

The Figures are merely schematic representations and serve only to illustrate examples of the disclosure. Identical or equivalent elements are in principle provided with the same reference signs.

DETAILED DESCRIPTION

Figure 1:
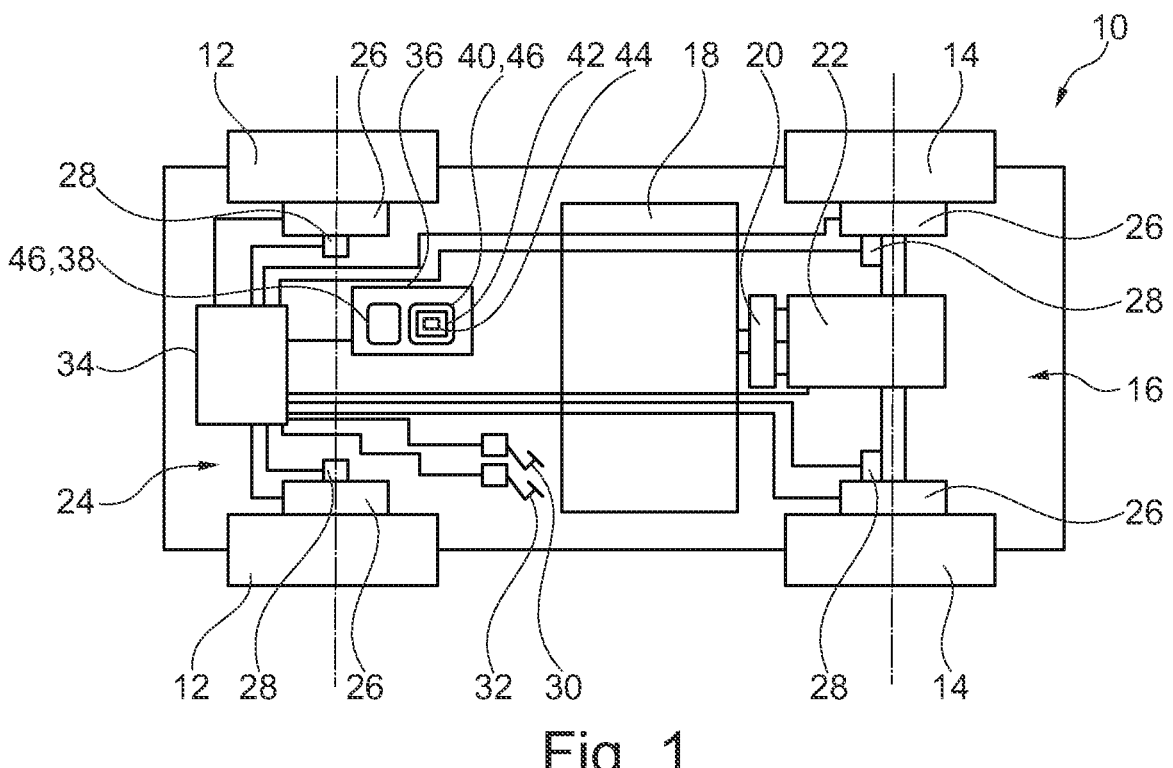
FIG. 1 shows a vehicle according to the present disclosure having a drivetrain according to the present disclosure with a data processing apparatus according to the present disclosure, a computer readable storage medium according to the present disclosure and a computer program according to the present disclosure, wherein a method for controlling a deceleration request in a one-pedal-driving mode can be executed in connection with the vehicle.

FIG. 1 shows a vehicle 10 having front wheels 12 and rear wheels 14.

In the present example, the vehicle 10 is a battery electric vehicle.

Consequently, the vehicle 10 has a drivetrain 16 which comprises a battery unit 18, an inverter unit 20 and an electric traction machine 22.

The electric traction machine 22 is drivingly coupled to the rear wheels 14.

The electric traction machine 22 is able to be operated as an electric motor or as an electric generator. This means that the electric traction machine 22 can be used to accelerate the rear wheels 14 and to decelerate the rear wheels 14. In doing so, using the electric traction machine 22, the vehicle 10 can be accelerated or decelerated.

Moreover, the vehicle 10 comprises a friction brake system 24 comprising a total of four wheel-side brake assemblies 26. Each of the wheel-side brake assemblies 26 is associated with one of the wheels 12, 14. Each of the wheel-side brake assemblies 26 for example comprises a brake disc being connected to the respective wheel 12, 14 and an associated brake caliper.

Additionally, the drivetrain comprises a total of four slip sensors 28.

Each of the four slip sensors 28 is associated with one of the wheels 12, 14.

Moreover, each slip sensor 28 is configured to generate a slip information describing a longitudinal slip of the associated wheel 12, 14.

The vehicle 10 additionally comprises a drive pedal 30 and the brake pedal 32. In this context, the vehicle 10 is configured to be used in a one-pedal-driving mode. This means that the vehicle 10 may be actively decelerated simply by fully or partially releasing the drive pedal 30 from a fully or partially depressed position.

The drivetrain 16 also comprises a drive control unit 34 being configured to control a driving operation of the vehicle 10 on wheel level. This means that the drive control unit 34 is able to control an acceleration of each of the rear wheels 14 via the electric traction machine 22. Additionally, the drive control unit 34 can control a deceleration of each of the rear wheels 14 using the electric traction machine 22 operating in a generator mode. Moreover, the drive control unit 34 is able to control a deceleration of each of the front wheels 12 and each of the rear wheels 14 using the friction brake system 24, i.e. the respective wheel-side brake assemblies 26.

To this end, the electric traction machine 22 is communicatively connected to the drive control unit 34. Moreover, each of the wheel side brake assemblies 26 is communicatively connected to the drive control unit 34.

Also the slip sensors 28 are communicatively connected to the drive control unit 34.

The drive control unit 34 is also communicatively connected to the drive pedal 30 and to the brake pedal 32.

Furthermore, the drivetrain 16 comprises data processing apparatus 36.

The data processing apparatus 36 is communicatively connected to the drive control unit 34. In an alternative, the data processing apparatus may as well be formed as a sub-system of the drive control unit 34.

This means that the data processing apparatus 36 is also communicatively connected to the electric traction machine 22, to each of the slip sensors 28, to the drive pedal 30 and to the brake pedal 32.

The data processing apparatus 36 comprises a data processing unit 38 and a data storage unit 40.

The data storage unit 40 comprises a computer readable storage medium 42.

On the computer readable storage medium 42, there is provided a computer program 44. The computer program 44 and, thus, also the computer readable storage medium 42 comprise instructions which, when the computer program 44 is executed by the data processing unit 38 or, more generally speaking, a computer cause the computer or the data processing unit 38 to carry out a method for controlling a deceleration request in a one-pedal-driving mode.

Consequently, the data processing unit 38 and the data storage unit 40 may also be called means 46 for carrying out the method for controlling a deceleration request in a one-pedal-driving mode.

Figure 2:
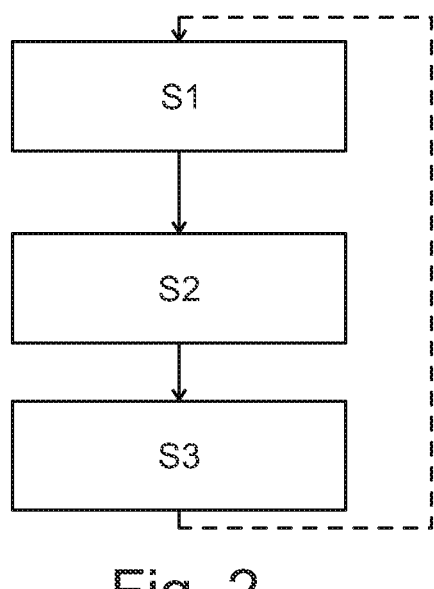
FIG. 2 illustrates steps of the method for controlling a deceleration request in a one-pedal-driving mode.

In the following, this method will be explained in more detail in connection with FIG. 2.

The method is executed in a situation in which the vehicle 10 is in a one-pedal-driving mode. In this mode, the vehicle 10 may be actively decelerated either by operating the electric traction machine 22 as a generator or by using the friction brake system 24. In the present example this is the case, if the drive pedal 30 is fully or partially released from a fully or partially depressed position.

In other words, a deceleration request being characterized by a deceleration level, i.e. a desired deceleration, is generated by the data processing apparatus 36 and provided to the drive control unit 34, if the drive pedal 30 is fully or partially released from a fully or partially depressed position.

The deceleration level of the deceleration request is a function of a position of the drive pedal 30. This means that a higher deceleration level is requested in a case in which the drive pedal 30 is released to a large extent or is fully released. If the drive pedal 30 is just released a bit, a comparatively small deceleration level is requested.

For the performance of the method for controlling a deceleration request in a one-pedal-driving mode, it is assumed that the drive pedal 30 is released by a certain extent, e.g. from a depression of 50% of the pedal way to a depression of 20% of the pedal way.

In a first step S1 of the method, a slip information for each of the wheels 12, 14 is received at the data processing apparatus 36. This slip information is generated by the wheel slip sensors 28. As has been mentioned before, the slip information describes a longitudinal slip of the respective wheel 12, 14.

In a second step S2, the slip information of each wheel 12, 14 is compared to a predefined wheel slip threshold. The predefined wheel slip threshold may be stored on the computer readable storage medium 42.

For performing the comparison, the data processing unit 38 may be used.

Subsequently, in a third step S3, a reduction of the deceleration level of the deceleration request is triggered under the condition that the slip information of at least two wheels of the same axle exceeds the predefined wheel slip threshold. This applies to both the front axle and the rear axle, i.e. the front wheels 12 and the rear wheels 14.

The second condition is that the slip information of all wheels exceeds the predefined wheel slip threshold.

If this condition is not met, the method is abandoned.

It is noted that the deceleration request relates to a regenerative deceleration and/or a deceleration through the friction brake system 24. This includes any combination of regenerative deceleration and deceleration through the friction brake system.

In the present example, the triggered reduction of the deceleration level relates to a predefined reduction increment. This means that the deceleration level is decreased or reduced by the predefined reduction increment.

Moreover, the method is performed periodically. This means that the method is triggered in accordance with a regular time schedule. At each instance, the deceleration level of the deceleration request may be adapted to a current longitudinal slip situation, i.e. to the occurrence of slip at the wheels 12, 14 of the vehicle 10.

Beyond that, in a case in which a brake pedal operation information is received, i.e. in a case in which the brake pedal 32 is operated by the driver, the reduction of the deceleration level is eliminated. This means that the deceleration level is moved back to its original state or magnitude. Thereby, the elimination of the reduction of the deceleration level is performed by ramping out the reduction.

According to an alternative, the condition for triggering a reduction of the deceleration level of the deceleration request in the third step S3 is that the slip information of all wheels exceeds the predefined wheel slip threshold. Beyond that, the above explanations apply mutatis mutandis.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

A computing device or system may include a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The computing system may include clients and servers. A client and server are remote from each other and typically interact through a communication network. The relationship of the client and server arises by virtue of computer programs running on the respective computers and having a client-server relationship with each other.

As used herein the term "component" refers to a distinct and identifiable part, element, subsystem, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software and/or other engineering elements.

The terms "non-transitory computer readable medium" and "computer readable medium" include a single medium or multiple media such as a centralized or distributed database, and/or associated caches and servers that store one or more sets of instructions. Further, the terms "non-transitory computer readable medium" and "computer readable medium" include any tangible medium that is capable of storing, encoding, or carrying a set of instructions for execution by a processor that, for example, when executed, cause a system to perform any one or more of the methods or operations disclosed herein. As used herein, the term "computer readable medium" is expressly defined to include any type of computer readable storage device and/or storage disk and to exclude propagating signals.

In addition, a non-transitory machine-readable medium and/or a system may embody the various operations, processes, and methods disclosed herein. Accordingly, the specification and drawings are illustrative rather than restrictive.

Physical computer readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

Further, a computer system including one or more processors and computer readable media such as computer memory may practice the methods. In particular, one or more processors execute computer-executable instructions, stored in the computer memory, to perform various functions such as the acts recited in the embodiments.

As used herein the term "data processing unit" may be used interchangeably with processor in many contexts. Both terms generally refer to a component or unit within a computing system that is responsible for carrying out operations on data. The processor, or central processing unit (CPU), is an element of a computer that performs arithmetic and logic operations, executes instructions from computer programs, and manages data movement within the system.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Computer readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

Digital electronic circuitry, or in computer software, firmware, or hardware, including the structures disclosed in this specification and their structural equivalents, or in combinations of one or more of them may realize the implementations and all of the functional operations described in this specification. Implementations may be as one or more computer program products i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

Aspects of the one or more embodiments described herein are described with reference to flowchart illustrations and/or block diagrams of methods, apparatus (systems), and computer program products according to one or more embodiments described herein. Each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable subcombination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

LIST OF REFERENCE SIGNS 10 vehicle
12 front wheel
14 rear wheel
16 drivetrain
18 battery unit
20 inverter unit
22 electric traction machine
24 friction brake system
26 wheel-side brake assembly
28 slip sensor
30 drive pedal
32 brake pedal
34 drive control unit
36 data processing apparatus
38 data processing unit
40 data storage unit 42 computer readable storage medium
44 computer program
46 means for carrying out a method for controlling a deceleration request in a one-pedal-driving mode
S1 first step
S2 second step
S3 third step

What is claimed is:

1. A method comprising:
receiving a slip information, wherein the slip information describes a longitudinal slip of a wheel of a vehicle;
comparing the slip information of each wheel to a predefined wheel slip threshold; and
triggering a reduction of a deceleration level of a deceleration request when the slip information of at least one wheel exceeds the predefined wheel slip threshold; and
wherein the method is operable for controlling the deceleration request in a one-pedal-driving mode of the vehicle, and
wherein the deceleration request relates to the deceleration level being a function of a position of a drive pedal, and wherein the deceleration request is based on a driving history.

2. The method of claim 1, wherein the slip information is determined by comparing at least one of a speed, an acceleration, and a combination of speed and acceleration of a first component of the vehicle to at least one of a speed and an acceleration, and a combination of speed and acceleration of a second component of the vehicle.

3. The method of claim 2, wherein the first component is at least one of a first wheel of the vehicle, a first axle of the vehicle, a first motor of the vehicle and a first part of the vehicle that gives an indication of a rotational speed of at least one of the first wheel, the first axle, and the first motor; and wherein the second component is at least one of a second wheel of the vehicle, a second axle of the vehicle, a second motor of the vehicle and a second part of the vehicle that gives an indication of a rotational speed of at least one of the second wheel, the second axle, and the second motor; and wherein the second component is different from the first component.

4. The method of claim 1, wherein the method comprises triggering a reduction of the deceleration level of the deceleration request when the slip information of at least two wheels exceeds the predefined wheel slip threshold.

5. The method of claim 4, wherein the at least two wheels are wheels of the same axle.

6. The method of claim 1, wherein the method further comprises:
receiving a brake pedal operation information, and
eliminating the reduction of the deceleration level of the deceleration request.

7. The method of claim 6, wherein eliminating the reduction of the deceleration level of the deceleration request comprises ramping out the reduction of the deceleration level.

8. The method of claim 1, wherein the method comprises triggering a reduction of the deceleration level of the deceleration request when the slip information of all wheels exceeds the predefined wheel slip threshold.

9. The method of claim 1, wherein the deceleration request relates to at least one of a regenerative deceleration and a deceleration through friction brakes.

10. The method of claim 1, wherein triggering a reduction of the deceleration level of the deceleration request comprises triggering a reduction by a predefined reduction increment.

11. The method of claim 1, wherein the method is executed periodically.

12. The method of claim 1, wherein the method is executed according to a predefined schedule.

13. The method of claim 1, wherein the slip information is obtained from a slip sensor associated with each of a vehicle's wheels.

14. A system comprising, an electric traction machine, a slip sensor, and a data processing apparatus, wherein the data processing apparatus is communicatively connected to the electric traction machine and the slip sensor;

wherein the data processing apparatus is operable for, receiving a slip information, wherein the slip information describes a longitudinal slip of a wheel of a vehicle;

comparing the slip information of each wheel to a predefined wheel slip threshold; and triggering a reduction of a deceleration level of a deceleration request when the slip information of at least one wheel exceeds the predefined wheel slip threshold;

wherein the system is operable for controlling the deceleration request in a one-pedal-driving mode of the vehicle, and wherein the deceleration request relates to the deceleration level being a function of a position of a drive pedal, and wherein the deceleration request is based on a driving history.

15. The system of claim 14, wherein the slip information is determined by comparing at least one of a speed, an acceleration, and a combination of speed and acceleration of a first component of the vehicle to at least one of a speed and an acceleration, and a combination of speed and acceleration of a second component of the vehicle.

16. The system of claim 15, wherein the first component is at least one of a first wheel of the vehicle, a first axle of the vehicle, a first motor of the vehicle and a first part of the vehicle that gives an indication of a rotational speed of at least one of the first wheel, the first axle, and the first motor; and wherein the second component is at least one of a second wheel of the vehicle, a second axle of the vehicle, a second motor of the vehicle and a second part of the vehicle that gives an indication of a rotational speed of at least one of the second wheel, the second axle, and the second motor; and wherein the second component is different from the first component.

17. The system of claim 14, wherein the system is a component of a drivetrain of a vehicle.

18. The system of claim 14, wherein the system is a component of a vehicle.

19. A non-transitory computer readable medium having stored thereon instructions executable by a computer system to perform operations comprising:

receiving a slip information, wherein the slip information describes a longitudinal slip of a wheel of a vehicle;

comparing the slip information of each wheel to a predefined wheel slip threshold; and triggering a reduction of a deceleration level of a deceleration request when the slip information of at least one wheel exceeds the predefined wheel slip threshold;

wherein the instructions are operable for controlling the deceleration request in a one-pedal-driving mode of the vehicle, and wherein the deceleration request relates to the deceleration level being a function of a position of a drive pedal, and wherein the deceleration request is based on a driving history.

20. The non-transitory computer readable medium of claim 19, wherein the slip information is determined by comparing at least one of a speed, an acceleration, and a combination of speed and acceleration of a first component of the vehicle to at least one of a speed and an acceleration, and a combination of speed and acceleration of a second component of the vehicle; and wherein the first component is at least one of a first wheel of the vehicle, a first axle of the vehicle, a first motor of the vehicle and a first part of the vehicle that gives an indication of a rotational speed of at least one of the first wheel, the first axle, and the first motor; and wherein the second component is at least one of a second wheel of the vehicle, a second axle of the vehicle, a second motor of the vehicle and a second part of the vehicle that gives an indication of a rotational speed of at least one of the second wheel, the second axle, and the second motor; and wherein the second component is different from the first component.

* * * * *